Feb. 21, 1939.  E. H. THOMPSON  2,147,937
METER
Filed March 21, 1935    5 Sheets-Sheet 2
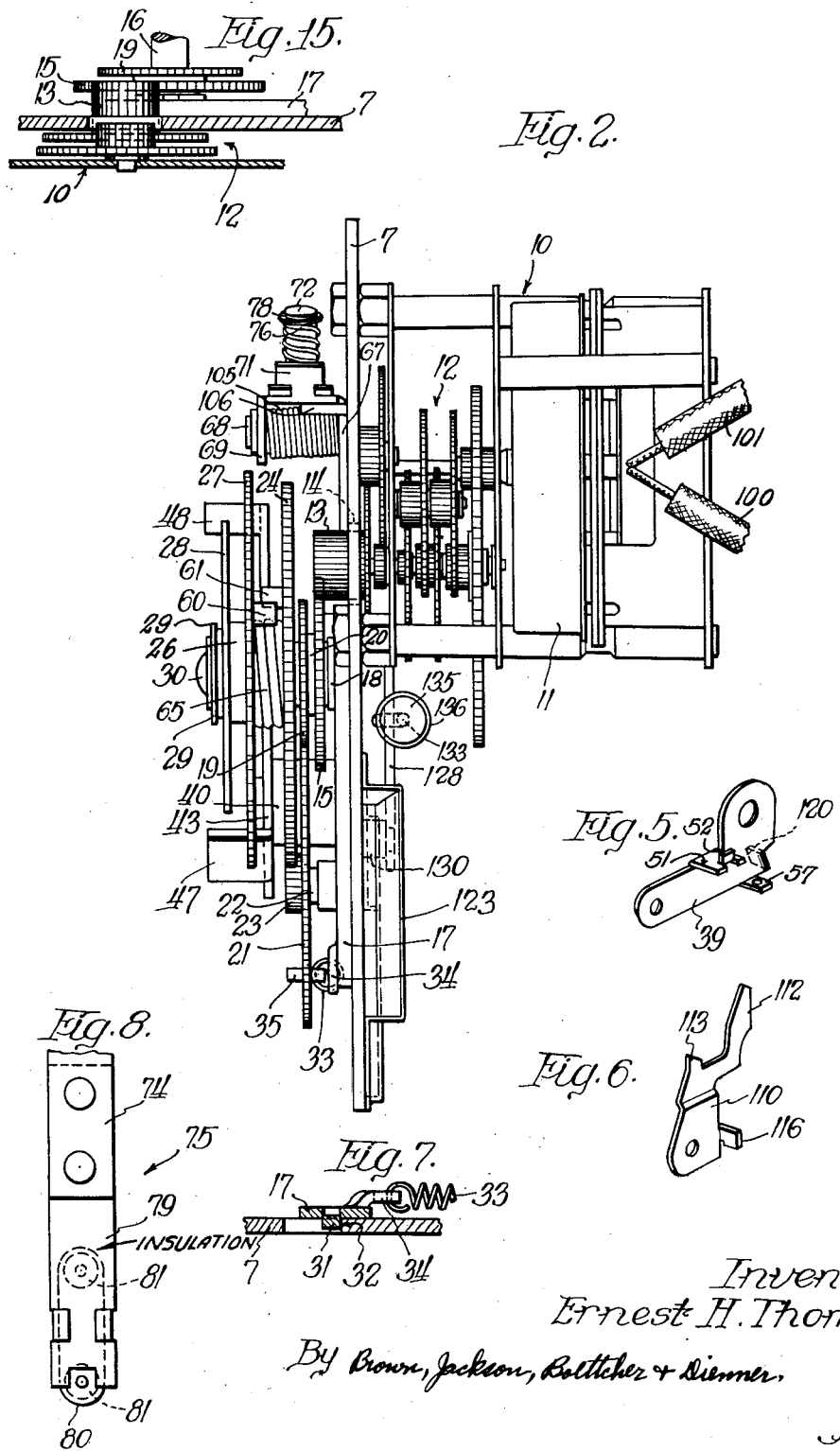
Inventor:
Ernest H. Thompson.
By Brown, Jackson, Boettcher & Diemer,
Attys.

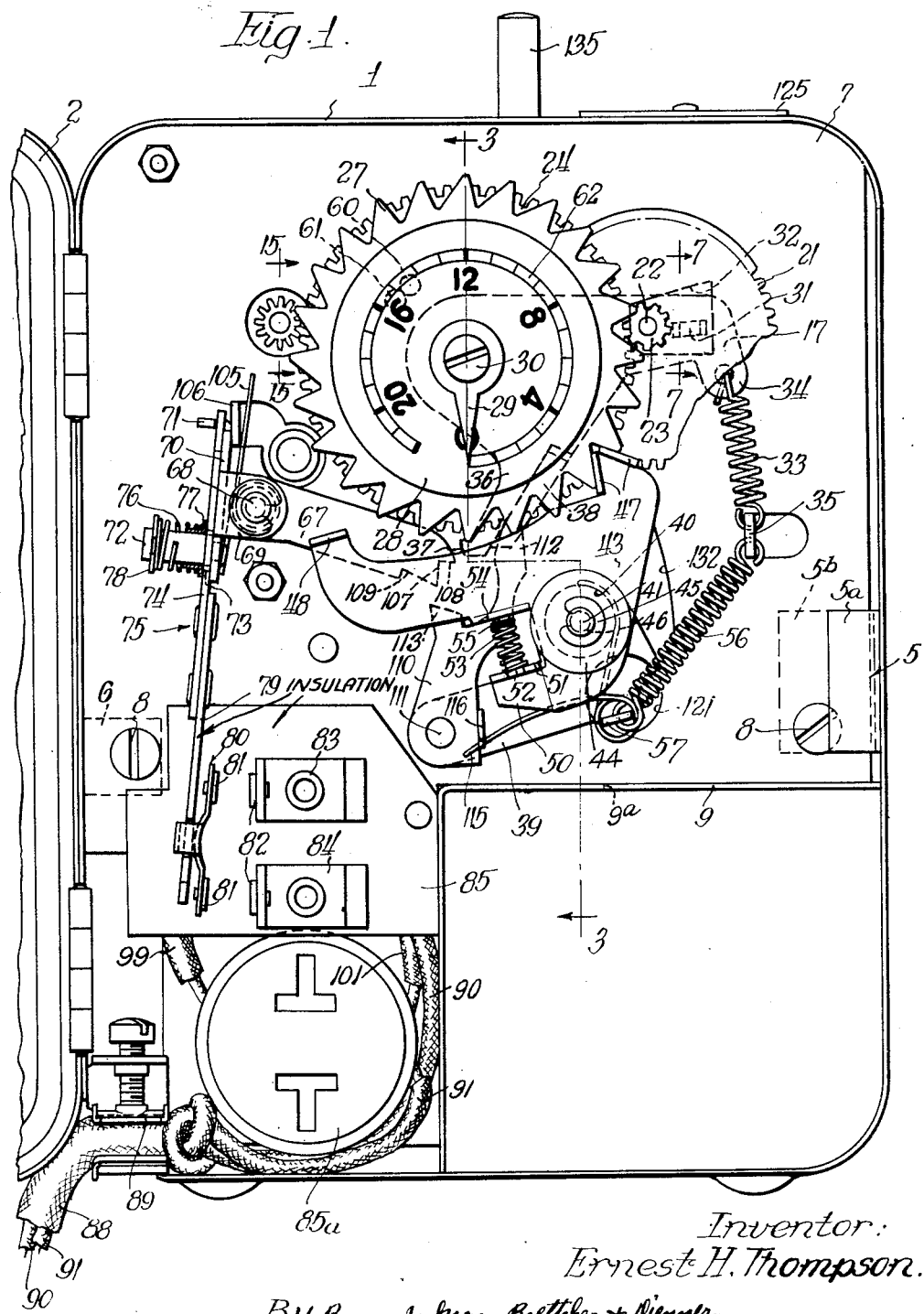

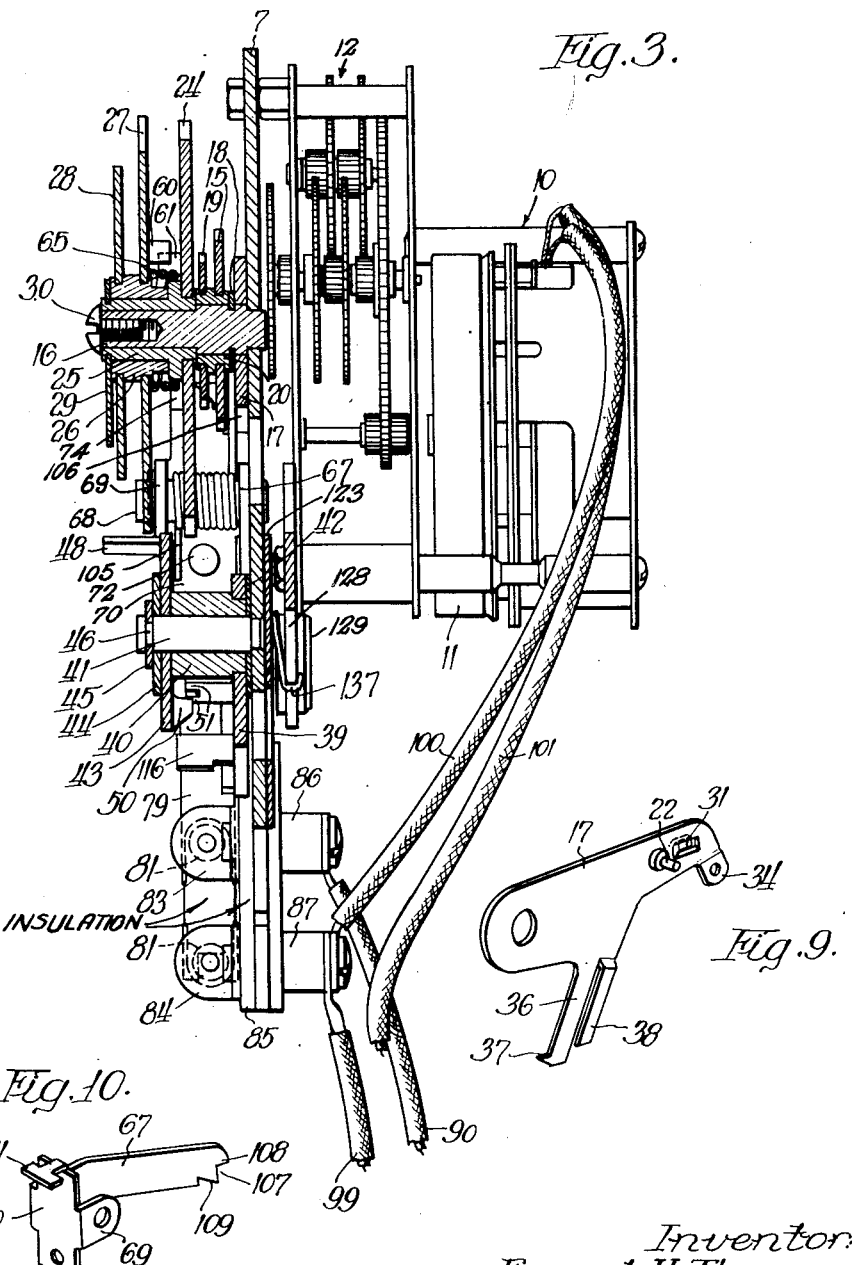

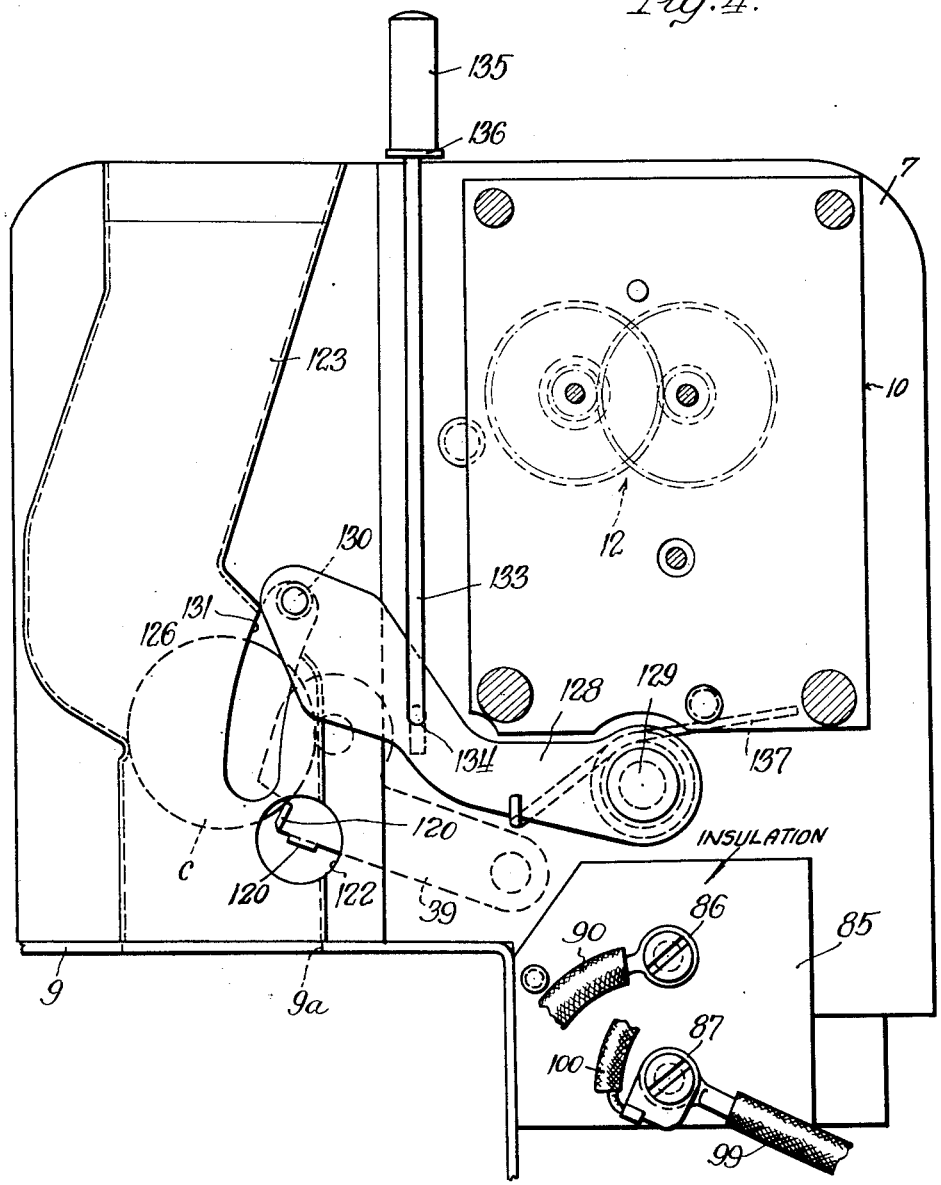

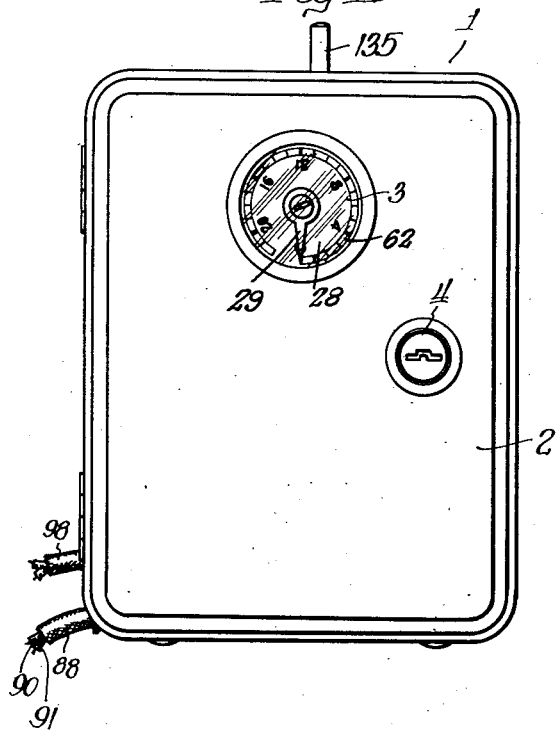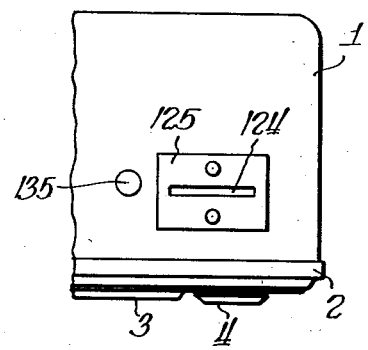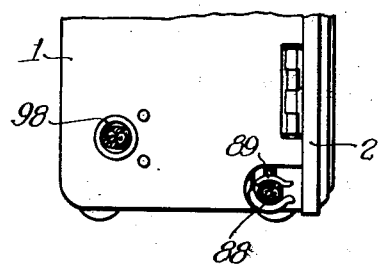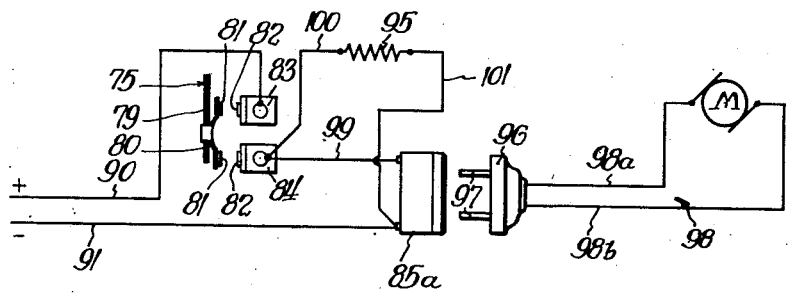

Patented Feb. 21, 1939

2,147,937

UNITED STATES PATENT OFFICE 2,147,937

METER

Ernest H. Thompson, Chicago, Ill., assignor to International Register Company, Chicago, Ill., a corporation of Illinois Application March 21, 1935, Serial No. 12,166

3 Claims. (Cl. 161—1)

This invention relates to meters, and has to do with a meter particularly suitable for use with a mechanism which is sold on the time payment plan, the agreed upon payments being effected by insertion of coins of proper value into the meter.

The meter of my invention is particularly suitable for use with electric refrigerators, though it may be used to advantage with various mechanisms. My invention is directed to the provision of a meter in which the timing may be varied with expedition and facility to suit the agreed upon rate of payment in any given case.

In the drawings:—

Figure 1 is a front view of a meter embodying my invention mounted in a suitable casing, the door of the casing being in open position;

Figure 2 is a plan view of the meter removed from the casing;

Figure 3 is a sectional view through the meter taken substantially on line 3—3 of Figure 1, parts being shown in elevation;

Figure 4 is a back view of the meter removed from the casing, parts being omitted for clearness of illustration;

Figure 5 is a detail perspective view of the setting lever;

Figure 6 is a detail perspective view of the switch setting pawl;

Figure 7 is a detail fragmentary sectional view taken substantially on line 7—7 of Figure 1;

Figure 8 is an outer side view of the lower portion of the switch arm and associated parts;

Figure 9 is a detail perspective view of the switch control lever;

Figure 10 is a perspective detail view of the latch arm of the movable switch arm;

Figure 11 is a front view, on a reduced scale, of a meter embodying my invention with the door of the casing closed;

Figure 12 is a fragmentary plan view of the meter of Figure 11;

Figure 13 is a fragmentary side view of the meter, disposed in its casing;

Figure 14 is a circuit diagram of the electrical connections of the meter and the mechanism controlled thereby;

Figure 15 is a section taken substantially on line 15—15 of Figure 1.

In Figures 1 to 4, inclusive, the meter is illustrated as approximately one and one-half times its actual size, for clearness of illustration. The mechanism of the meter is disposed within a suitable casing 1, the front of which is normally closed by a hingedly mounted door 2 provided with a window 3 for observation of the dial of the meter mechanism, as will be explained. The door is further provided with a key operated cylinder lock 4 of known type having an element disposed to engage in back of the forward arm 5a of a U-shaped bracket 5 spot-welded or otherwise suitably secured to one side wall of the casing. Inner arm 5b of bracket 5 projects inwardly of casing 1 beyond arm 5a, and a bracket 6 is secured to the inner face of the other side wall of the casing. A supporting plate 7 fits within casing 1 and seats upon bracket 6 and arm 5b of bracket 5, this plate being secured to the brackets by screws 8, or in any other suitable manner. The lower portion of plate 7 is cut away to accommodate a plate 9 of approximately L-shape in front view, this plate 9 defining, with the adjacent portions of the bottom and side walls of the casing, a coin receptacle which receives the coins inserted into the meter, as will be later described.

A clockwork assembly 10 is suitably mounted on plate 7 at the back thereof. This assembly comprises a self-starting synchronous motor 11 of known type, which, through a gear train 12, drives a pinion 13 at constant speed. This pinion projects through an opening 14 in plate 7, and the front of the pinion is flush with the front face of a gear 15 with which the pinion meshes. Gear 15 is rotatably mounted on a stub shaft 16 secured in plate 7, and is disposed in front of a switch control lever 17 mounted for free turning movement on the stub shaft and confined between plate 7 and a slotted lock member 18 of known type which engages into a circumferential groove in the stub shaft. A gear 19 is secured on hub 20 of gear 15, in front of and spaced from the latter gear. Gear 19 meshes with a gear 21 rotatably mounted on a pin 22 carried by lever 17 and disposed remote from stub shaft 16. A pinion 23, secured to gear 21 at the front face thereof, meshes with a relatively large gear 24, rotatably mounted on stub shaft 16 in front of hub 20 of gears 15 and 19. Gear 21 and pinion 23 are driven in a counterclockwise direction, pinion 23 normally driving gear 24 in a clockwise direction, as viewed in Figure 1.

Gear 24 is provided with a forwardly extending hub 25 on which is rotatably mounted a hub 26 upon which is secured a toothed wheel 27. A suitably graduated dial 28 is secured on the outer end of hub 26, and a pointer 29 is secured on the outer end of hub 25 of gear 24, in front of and closely adjacent the outer end of hub 26, hubs 25 and 26 being thus held against appreciable relative endwise movement. A retaining member, conveniently a screw 30, is secured in the outer end of stub shaft 16 and overlie the forward end of hub 25, normally holding the latter against movement lengthwise of stub shaft 16 toward the forward or outer end thereof. The gear 24 and wheel 27 and associated parts constitute a setting and controlling assembly normally held upon the stub shaft 16 by screw 30, which assembly can be removed from the stub shaft endwise thereof upon removal of the screw. Normally, gear 24 overlies gear 21, as in Figure 1, and prevents outward movement of the latter on pin 22 while also preventing movement of gears 15 and 19 lengthwise of stub shaft 16 toward the outer or forward end of the latter. By removing the setting and controlling assembly from stub shaft 16, ready access is had to gears 21 and 19 and 15, which may then be removed and replaced with facility. In order to vary the timing of the mechanism, the unit comprising gears 15 and 19, and the unit comprising gear 21 and pinion 23, may be replaced by similar units in which the ratio between gears 19 and 21 is different from the ratio between these gears of the replaced units and of proper value to give the desired timing of the mechanism. After this adjustment has been effected, the controlling and setting assembly is replaced upon stub shaft 16. This provides extremely simple means for adjusting the timing of the mechanism to suit requirements.

Lever 17 is provided, adjacent its free end, with a tongue 31, struck rearwardly therefrom and projecting into an opening 32 in plate 7 (Figure 7), this tongue cooperating with the bottom edge of opening 32 for limiting turning movement of the lever 17 in clockwise direction on stub shaft 16. Normally, the lever 17 is held in its extreme position in a clockwise direction about the stub shaft, which is its operative position, with tongue 31 in contact with the lower edge of opening 32, by a tension spring 33, the upper end of which is hooked through a tab 34 extending downward from the outer end of lever 17, the lower end of this spring being hooked through a tab 35 struck from plate 7 and projecting forwardly thereof. Lever 17 is further provided with an arm 36 extending therefrom at an inclination downward and away from the outer end of the lever, the lower end of this arm being shaped to provide an upwardly projecting latch element 37. Arm 17 is provided, at its lower edge, with a forwardly offset element 38 which forms with plate 7 a pocket for reception of an element of a setting pawl, hereinafter described in detail.

A setting lever 39, shaped as shown in Figures 1 and 5, is secured upon the reduced rearward end of a sleeve 40, mounted for turning movement on a post 41 secured in plate 7 below arm 36 of lever 17. A washer 42 is interposed between lever 39 and plate 7. A timer setting pawl 43 is mounted for turning movement on post 41 and is confined between the forward end of sleeve 40 and a washer 44 confined between lever 43 and a lock member 45 of known type engaging into a circumferential groove 46 in the post. Setting pawl 43 is provided, at the end thereof adjacent gear 21, with two tabs 47 which project forward from the pawl and converge toward wheel 27, these tabs defining a tooth element adapted for engagement between the teeth of the wheel. Pawl 43 is further provided, at its other end, with a forwardly projecting tab 48 disposed to contact the following edges of the teeth of wheel 27, and cooperating with the tooth defined by tabs 47 for imparting clockwise rotation to wheel 27 in the operation of setting the mechanism for a predetermined time period of operation. Pawl 43 is provided with a stop finger 50 disposed to contact the lower face of a tab 51 projecting forwardly of lever 39 at the upper edge thereof. The central part of tab 51 is struck upwardly to provide a stud 52 which extends into the lower end of a compression coil spring 53, confined between tab 51 and a tab 54 projecting rearwardly from the timer setting pawl 43 at the lower edge thereof. The central portion of tab 54 is struck downward to provide a stud 55 which extends into the upper end portion of spring 53. A tension spring 56 is attached at its upper end to tab 35 of plate 7, and has its lower end hooked through a tab 57 projecting forwardly from lever 39 at the lower edge thereof. This tension spring normally holds lever 39 in such position that tab 51 thereof contacts the upper edge of finger 50 of the timer setting pawl 43, and retains the latter in such position that the tooth element defined by tabs 47 engages between two adjacent teeth of toothed wheel 27 and locks the latter against rotation in either direction.

Wheel 27 is provided with a pin 60 secured therein and projecting rearwardly therefrom. This pin is disposed in advance of, and in the path of travel of, a pin 61 secured to and projecting forwardly from gear 24, this latter pin traveling clockwise with the gear when the latter is driven. By operation of the timer setting pawl 43, wheel 27 is rotated step by step in a clockwise direction so as to advance pin 60 relative to pin 61, thus predetermining the time period of operation of the mechanism controlled by the meter. Dial 28 turns with wheel 27 so as to move a suitably graduated scale 62 on the front face of the dial beneath pointer 29. Each graduation of this scale corresponds to the rotary movement of wheel 27 during one actuation of the pawl 43, due to insertion of a coin, so that the pointer and the scale indicate the number of coins which have been inserted and also provide means for determining the period of time for which the mechanism can operate before it becomes necessary to insert additional coins, that is, the remaining period of time during which the controlled mechanism is capable of being operated. By altering the ratio of the timing gears 19 and 21, in the manner previously described, the timing mechanism can be varied to suit payments of from 15¢ per day to $2.00 per day. Assuming that the mechanism is adjusted for payments at the rate of 25¢ every twenty-four hours, the meter being intended for reception of 25¢ pieces or quarters, when a quarter is inserted and the pawl 43 is operated, wheel 27 will be rotated through a distance equal to one space on the scale 62. In this case, the number of spaces on the scale indicated by the pointer 29, in addition to indicating the number of coins inserted or payments made, will also indicate in days the remaining time during which the controlled mechanism is capable of operation. On the other hand, if the mechanism is adjusted for a payment of 25¢ every three hours, the spaces on the scale 62 beyond the pointer 29, in a clockwise direction, will indicate the number of coins inserted and, if multiplied by three, will indicate the remaining number of hours for which the controlled mechanism is capable of operation. A coil spring 65, disposed about hubs 25 and 26, is confined under compression between gear 24 and wheel 27. This spring serves to prevent any objectionable endwise play between the parts of the controlling and setting mechanism, and also provides friction means for retarding rotation of wheel 27 so as to assure proper movement thereof in accordance with the operation of the timer setting pawl 43.

An arm 67 is pivotally mounted on a stud 68 secured in plate 7 and projecting forwardly therefrom adjacent ratchet wheel 27 and at the opposite side thereof from stud 41. Stud 68 passes through arm 67 and through a tab 69 parallel with arm 67 and projecting from the forward edge of a base plate 70 integral with the outer end of the arm. A T-shaped finger 71 projects from the upper end of plate 70 oppositely to arm 67. A pin 72 is secured through the lower end of plate 70 and extends loosely through an opening 73 in member 74 of a movable switch arm 75. Member 74 is conveniently formed of strip metal and has its upper end slotted and loosely inserted beneath the head of the T element 71 to permit of relative rocking movement between member 74 and element 71. A compression coil spring 76 is disposed about pin 72 and confined between a flanged collar 77 seating against the outer face of member 74 and an abutment member 78 of known type, in the form of a slotted locking member which engages into a circumferential groove in the pin. Arm 75 comprises a lower member 79, conveniently in the form of a strip of fiber, riveted or otherwise suitably secured to member 74. A bridging contact member 80 is suitably mounted on the lower end of member 79 for limited rocking movement on an axis extending transversely thereof. The contact member 80 carries two contact points 81 disposed for contact with points 82 of cooperating contact members 83 and 84, when the switch arm is in switch closing position. Members 83 and 84 are mounted on a supporting plate 85 of insulating material suitably secured to plate 7 and projecting downward therefrom. Binding posts 86 and 87 are suitably secured to the contact members 83 and 84, respectively, and project rearwardly from the supporting plate 85.

A suitable electrical connecting device 85a, in the form of a plug socket of known type, is mounted in a suitable manner in the lower portion of casing 1 adjacent and below the insulating supporting plate 85. An electrical cord or cable 88 extends into casing 1 through a suitable opening in the side wall thereof adjacent socket 85a, and is secured by a clamping device 89 of suitable type. This cord contains two wires 90 and 91 which may be connected into the local or house circuit in a suitable manner, as by means of a plug cap of known type cooperating with a plug socket member of the same general type as member 85a. The motor 11, for driving the gear train 12 and the timing mechanism, is, as previously noted, of known type and includes a field winding or coil 95. The member 85a cooperates with a plug cap 96 (Figure 14) having prongs 97 for insertion into member 85a for engagement with the contacts therein in a known manner. The cap member 96 is attached to one end of a cord 98 which extends into casing 1 through the same side thereof as cord 88. This provides simple and efficient means for establishing electrical connections between the control switch and a motor M of the controlled mechanism, such as an electrical refrigerator.

In Figure 14 I have shown diagrammatically the connections for the control switch, the field winding of the motor 11, and a motor M, which may be considered as the motor which drives the compressor and associated parts of an electrical refrigerator. Referring to this figure, wire 91 of cord 88 is shown as connected to one terminal of member 85a, the other terminal of which is connected by a lead 99 to contact member 84. Wire 90 of cord 88 is connected to the other contact member 83, one end of winding 95 of motor 11 is connected by lead 100 to contact member 84, and the other terminal of winding 95 is connected by a lead 101 to the terminal of member 85a to which wire 91 is connected. Wires 98a and 98b of cord 98 connect the prongs 97 to the poles of the refrigerator motor M. These connections are effected by attaching wires 99 and 100 to binding post 87, wire 90 being attached to binding post 86, and lead 99 and wire 91 being attached in the usual manner to the terminals of the socket member 85a. It will be seen that, when switch arm 75 is in closed position and the prongs 97 of plug cap 96 are inserted into plug member 85a, the circuit of field winding 95 of motor 11 is closed and this motor is continuously driven, and the circuit of motor M of the controlled mechanism is conditioned for operation of this latter motor, and that the circuits of both motors are opened when the switch arm 75 is in the open position of Figure 14. The field winding of motor 11 is preferably connected in shunt across the circuit of motor M, as shown, and means may be provided for controlling the circuit of motor M supplementary to the main control switch, such as a thermostatic switch, for automatically opening and closing the motor circuit in accordance with variations in temperature, and a manually operated switch for closing and opening the motor circuit as required, which are commonly provided in electrical refrigerators. In all instances, however, the control switch comprising the arm 75 renders the motor M incapable of operation when this switch is opened and capable of operation when the control switch is closed, so that the meter controls the operation of the electrical refrigerator or other controlled mechanism.

Switch arm 75 is yieldingly urged into switch opening position by a wire spring 105 coiled about stud 68, one arm of this spring bearing against the inner face of plate 70 adjacent the lower end thereof, and the other arm of this spring bearing against a tab 106 struck from plate 7 and projecting forwardly therefrom. Tab 106 also serves as a stop element for limiting the opening movement of arm 75, as shown in Figure 1.

Arm 67 is provided, at its inner end, with a notch 107 defining a latch element 108 adapted for cooperation with latch element 37 of arm 36 of lever 17, and is further provided, at its lower edge, with a notch forming an inclined edge 109. A switch setting pawl 110 is pivoted at its lower end, at 111, on the inner end of the setting lever 39. This pawl is provided, at its upper end, with a relatively long finger 112 and a short finger 113, the latter being disposed to contact edge 109 of arm 67 upon upward movement of pawl 110, when lever 17 is in its normal lowered position. Finger 117 extends into the pocket defined by element 38 of arm 36 and plate 7, and is yieldingly held in contact with the lower edge of arm 36 by a wire spring 115 disposed about tab 57, one arm of which spring contacts the lower edge of a tab 116 projecting forwardly from the outer edge of pawl 110, the other arm of spring 115 engaging about sleeve 40.

Setting lever 39 is provided, at its outer end, with a rearwardly extending tab 120 which projects through an opening 121 in plate 7, and a corresponding opening 122, in a coin chute 123 secured to the back of plate 7 (Fig. 4), the tab 120 extending across the chute from front to back thereof so as to intercept a coin passing through the chute. Coin chute 123 is preferably flared at its upper end, as shown, and is disposed in register with slot 124 of a plate 125 (Fig. 12) suitably secured to the top wall of casing 1. The coin chute is of suitable size for reception of 25¢ pieces or quarters, and is provided, intermediate its ends, with an inwardly offset portion 126 disposed to direct a coin c into contact with tab 120 upon which the coin rests edgewise, at which time the coin is disposed mainly above tab 120 and is confined between this tab and the remote side wall of chute 123.

An operating lever 128 is pivoted at one end, at 129, on the back of supporting plate 7. At its other end lever 128 is provided with a forwardly projecting pin 130 which projects through an arcuate slot 131 extending downward and across portion 126 of coin chute 123 and intersecting coin c, this slot 131 being aligned with a similar slot 132 in plate 7 (Fig. 1). An operating rod 133 (Fig. 4) is provided adjacent its lower end with a bend, forming an element 134 which is inserted through a corresponding opening in lever 128. The other end of rod 133 extends into an elongated button 135, slidable through the top wall of casing 1 and provided at its lower end with a flange 136 which cooperates with this wall for limiting upward movement of the rod. Lever 128 is urged in a clockwise direction about its pivot 129, as viewed in Figure 4, by a wire spring 137, one arm of which engages the lower edge of the lever, and the other arm of which contacts an element of the supporting structure of the clockwork 10.

In Figure 1, pointer 29 is at the zero position on scale 62, gear 24 is locked against rotation by contact of pin 61 with pin 60, and lever 17 has been raised by the planetary action of pinion 23 travelling around gear 24, releasing arm 67 and permitting movement of switch arm 75 into its open position by spring 105.

In order to close the control switch, a coin c (Figure 4) is inserted into the coin chute 123, after which the button 135 is depressed, thus swinging the operating lever 128 downward so as to bring pin 130 into contact with the coin and force the latter downward in the chute from the lower end of which it passes through a slot 9a in member 9 into the coin receptacle. This downward movement of the coin swings the outer end of setting lever 39 downward with resulting upward movement of the inner end of this lever and turning movement of the setting pawl 43 in a clockwise direction as viewed in Figure 1. In this movement of pawl 43 finger 48 thereof is positioned in advance of one of the teeth of wheel 27 and the tooth defined by tabs 47 of this pawl is then disengaged from the wheel. This permits turning by spring 33 of the setting and controlling assembly a short distance in a clockwise direction sufficient to return lever 17 to its normal lowered or operative position.

Finger 113 of pawl 110 then contacts edge 109 of arm 67 so as to move this arm upward and, at about the same time, finger 48 of pawl 43 contacts the following edge of a tooth of ratchet wheel 27 to as to rotate the same a slight distance in a clockwise direction. In the continued upward movement of pawl 110, arm 67 is raised, thus moving the switch arm 75 into switch closing position, and the inner end of arm 67 contacts the lower end of arm 36, swinging lever 17 a short distance in a counterclockwise direction against the tension of spring 33 until latch element 108 of arm 67 passes above latch element 37 of arm 36, at which time lever 17 is again returned to its lowermost position with a snap action by tension spring 33 so as to engage latch element 37 beneath latch element 108, thus locking the switch arm 75 in closed position. If thereafter lever 39 is actuated to move pawl 110 upward, arm 67 may be raised slightly, this being permitted by the loose and resilient connections between arms 67 and 75, previously referred to, but arm 67 is retained in switch closing position so long as lever 17 remains in its lowered position. This closes the circuit of motor 11, setting the meter in operation, and conditions the circuit of motor M for operation.

When the coin c passes beyond tab 120 of lever 39, this lever is returned to its normal position by tension spring 56. In the return movement of the lever 39, the tabs 47 of pawl 43 engage between two adjacent teeth of wheel 27, advancing the wheel the remaining one-half of a space of the scale 62, and then locking wheel 27 against rotation. In this manner, wheel 27 is advanced one full space of the scale upon insertion of a coin. Likewise, wheel 27 is advanced a corresponding distance for the insertion of each additional coin, it being noted that the scale 62 is provided with twenty-two spaces and the mechanism is intended for reception of twenty-two coins inserted one immediately after the other. It is possible, however, to advance the dial a further distance of one space before pin 60 thereof contacts pin 61 of gear 24, after twenty-two coins have been inserted, so that the maximum capacity of the meter, at a single setting thereof starting at zero, is twenty-three coins.

After closing of the control switch in the manner described, this switch will remain closed for a predetermined period of time, depending upon the number of coins inserted, this number and the time during which the switch will remain closed being indicated by the pointer 29 and scale 62. When the pointer 29 again reaches the zero position on the scale 62, gear 24 will be locked against rotation by contact of pin 61 of this gear with pin 60 of wheel 27, at which time pinion 23 will travel around gear 24 in a counterclockwise direction, thus raising lever 17 and disengaging latch element 37 of arm 36 from latch element 108 of arm 67, releasing the latter arm and permitting of switch arm 75 being moved into open position by spring 105.

It will be noted that rotation of wheel 27, for setting the mechanism for the predetermined time period of operation, is effected solely by the timer setting pawl 43, which contributes to accuracy of operation and simplicity of construction. A further important feature of my invention is the ease with which the timing of the mechanism, to suit various agreed upon payments can be effected, in the manner above described. The association of the switch closing and latching means with the timing and setting and control mechanism is advantageous as contributing to accuracy of operation and compactness of construction. It will be apparent to those skilled in the art that changes in construction and arrangement of parts of my invention may be resorted to without departing from the field and scope of the same, and I intend to include all such variations, as fall within the scope of the appended claims, in this application in which the preferred form only of my invention is disclosed.

What I claim is:—

1. In combination, a supporting plate, a stub-shaft projecting from one face of said plate, a control lever pivoted on said stub-shaft at said face of said plate, timing mechanism comprising a timing gear rotatably mounted on said shaft at the outer face of said lever, a constant speed motor driving said gear, a second timing gear rotatably mounted on said shaft at the outer side of said first gear and rotatable therewith, both of said gears being removable from said shaft by sliding movement therealong over the outer end thereof, means yieldingly urging said lever in one direction about said shaft normally holding said lever in operative position, a pin carried by said lever and projecting from the outer face thereof near the end remote from said shaft, a third timing gear rotatably mounted on said pin and meshing with said second timing gear, a pinion secured to said third gear at the outer face thereof, said third gear and said pinion being removable from and replaceable on said pin by sliding movement therealong, a fourth gear rotatably mounted on said shaft meshing with said pinion and overlying said first, second, and third timing gears and normally retaining them in their operative positions, controlling means comprising a member rotatably and removably mounted on said shaft at the outer side of said fourth gear and effective for preventing rotation thereof after a predetermined time period of operation of said mechanism, and actuating means effective for setting said controlling means for a predetermined time period of operation of said mechanism.

2. In combination, a supporting plate, a stub-shaft projecting from one face of said plate, a control lever pivoted on said shaft at said face of said plate and yieldingly urged in one direction about said shaft into operative position, a constant speed motor, timing mechanism comprising a timing gear driven by said motor rotatably mounted on said shaft at the outer face of said lever, a second timing gear rotatably and removably mounted on said lever at the outer face thereof meshing with said first gear, a pinion at the outer face of said second timing gear secured to the latter for rotation therewith, a third gear rotatably and removably mounted on said shaft overlying said first and second timing gears and meshing with said pinion, controlling means effective for preventing rotation of said third gear beyond a predetermined extent and thereby cause travel of said pinion about said third gear for moving said lever in the other direction, said controlling means comprising a control member rotatably and removably mounted on said shaft at the outer side of said third gear, and actuating means for setting said controlling means for predetermined rotation of said third gear.

3. In combination, a supporting plate, a stub-shaft projecting from one face of said plate, a control lever pivoted on said shaft at said face of said plate and yieldingly urged in one direction about said shaft into operative position, a constant speed motor, timing mechanism comprising a pair of timing gears driven by said motor secured together for rotation as a unit rotatably and removably mounted on said shaft at the outer side of said lever, a third timing gear rotatably and removably mounted on said lever at the outer side thereof and meshing with one of said pair of gears, a pinion secured to said third timing gear for rotation therewith, a fourth gear rotatably and removably mounted on said shaft overlying said pair of gears and said third gear and meshing with said pinion, controlling means associated with said mechanism effective to prevent rotation of said fourth gear beyond a predetermined extent and thereby cause travel of said pinion about said fourth gear for moving said lever in the other direction, and actuating means for setting said controlling means for predetermined rotation of said fourth gear.

ERNEST H. THOMPSON.